United States Patent [19]

Bäbler et al.

[11] 4,055,439
[45] Oct. 25, 1977

[54] PROCESS FOR THE MANUFACTURE OF DUSTLESS, READILY DISPERSIBLE PIGMENT GRANULES

[75] Inventors: Fridolin Bäbler, Allschwil; Hans Mollet, Reinach; Günther Zwahlen, Dornach, all of Switzerland

[73] Assignee: Ciba-Geigy Corporation, Ardsley, N.Y.

[21] Appl. No.: 608,617

[22] Filed: Aug. 28, 1975

[30] Foreign Application Priority Data

Sept. 13, 1974 Switzerland .................. 12519/74

[51] Int. Cl.² ............................................. C08K 5/00
[52] U.S. Cl. ................................. 106/288 Q; 106/309
[58] Field of Search ....................... 106/309, 288 Q

[56] References Cited

U.S. PATENT DOCUMENTS

| 3,127,412 | 3/1964 | Gaertner et al. | 106/309 |
| 3,758,321 | 9/1973 | Santimauro et al. | 106/309 |
| 3,925,096 | 12/1975 | Karkov | 106/309 |

Primary Examiner—Patrick P. Garvin
Assistant Examiner—J. V. Howard
Attorney, Agent, or Firm—Vincent J. Cavalieri

[57] ABSTRACT

A process for the manufacture of an easily isolatable, dustless, readily dispersible pigment granulate which comprises subjecting a suspension of a finely dispersed organic pigment or pigment preparation, in the presence of water-insoluble granulating assistants belonging to the class of natural, synthetic or semi-synthetic resins, esters of dicarboxylic acids, of arylcarboxylic acids, of arylsulphonic acids, of phosphoric and phosphorous acid, phenylsulphonamides or the alkaline salts of fatty acids containing 12 to 14 carbon atoms, but in the absence of wetting agents, in a two-phase system consisting of an aqueous phase and a second liquid phase which consists substantially of an organic solvent that is virtually insoluble in water and in which the granulating assistant is at least partially soluble, to a turbulent mixing until a granulate has formed, then isolating said granulate, which consists substantially of pigment or pigment preparation, granulating assistant and organic solvent, and removing the solvent therefrom.

15 Claims, No Drawings

PROCESS FOR THE MANUFACTURE OF DUSTLESS, READILY DISPERSIBLE PIGMENT GRANULES

The invention provides a process for the manufacture of easily isolatable, dustless and readily dispersible granulates of pigments and pigment preparations, which process comprises subjecting a suspension of a finely dispersed organic pigment or pigment preparation, in the presence of water-insoluble granulating assistants belonging to the class of natural, synthetic or semi-synthetic resins, esters of dicarboxylic acids, arylcarboxylic acids, arylsulphonic acids, of phosphoric and phosphorous acid, phenylsulphonamides or the alkaline salts of fatty acids containing 12 to 24 carbon atoms, but in the absence of wetting agents, in a two-phase system consisting of an aqueous phase and a second liquid phase which consists substantially of an organic solvent that is virtually insoluble in water and in which the granulating assistant is at least partially soluble, to a turbulent mixing until a granulate has formed, then isolating said granulate, which consists substantially of pigment or pigment preparation, granulating assistant and organic solvent, and removing the solvent therefrom.

The organic pigments which can be used according to the invention can belong to the most widely different chemical calsses, for example to the class of the azo, azomethine, anthraquinone, phthalocyanine, nitro, perinone, perylene, dioxazine, thioindigo, iminoisoindolinone or quinacridone pigments. Metal complexes, for example of azo, azomethine or methine dyes of pigment character, are also suitable. It is also possible to use mixtures of different pigments.

Instead of pure pigments, ready for use pigments preparations can also be used, i.e. preparations which contain in addition to the pigment for example 20 to 90%, preferably between 40 and 60%, of a carrier.

The pigments are advantageously in finely divided form, i.e. the particle size is desirably between 0.05 and 5μ as obtained, for example, by grinding per kneading the crude pigments, optionally in the presence of solvents and other additives, or by appropriate control of the synthesis process. They can be used in the form of dry powders or preferably as moist filter cakes.

Suitable granulating assistants are preferably synthetic, semi-synthetic and natural resins. The synthetic or semi-synthetic resins can be polymerisation, polycondensation or polyaddition products. In principle it is possible to use all resins and binders commonly in use in the paint and printing ink industry and described, for example, in the paint and varnish raw materials tables of Karsten, 4th. and 5th. edition, Hannover, 1967 and 1972 respectively, and/or in Wagner and Sarx's book on paint resins, 5th. edition, Munich 1971. High molecular weight compounds with plastic character, as described for example in the "Kunststoff-Taschenbuch", Carl Hanser Verlag, Munich (18th. edition 1971), can also be used as granulating assistants. It is preferred to use those resins which do not react further chemically on contact with air or with themselves and possibly crosslink.

Preferred classes of resin are: a) colophonium and its derivatives in all forms, for example hydrogenated, dimerised or polymerised, esterified with monohydric or polyhydric alcohols, with resin formers, as for example acrylic acid and butanediol or maleic acid and pentaerythritol, modified colophonium resin, calcium or zinc salts of colophonium, abietic acid and esters thereof; the soluble phenolic resins modified with colophonium and resins based on acrylic compounds, as well as other natural resins, as for example linseed oil varnish, shellack and other copals, and water-soluble salts of rosinamine; b) maleic resins, oil-free alkyd resins, styrenated alkyd resins, vinyl toluene modified alkyd resins, alkyd resins with synthetic fatty acids, linseed oil alkyd resins, ricinenic alkyd resins, castor oil alkyd resins, soya oil alkyd resins, coconut oil alkyd resins, tall oil and fish oil alkyd resins and acrylated alkyd resins, (c) terpene resins and terpenephenol resins; (d) polyvinyl resins, e.g.: polyvinyl acetate, polyvinyl chloride and polyvinylidene chloride, polyvinyl acetals, polyvinyl ethers, copolymers and graft copolymers with different vinyl monomers, polyacrylic acid resins, as for example acrylic and methacrylic esters and their copolymers; (e) styrene polymers and copolymers; (f) polyolefins, polyethylene, polypropylene, polybutylene, polyisobutylene, polyisoprene, substituted polyolefins, halogenated polyolefins and their copolymers, as for example ethylene and vinyl acetate copolymers and other synthetic resins based on unsaturated hydrocarbons, e.g. low molecular polystyrenes, and especially the polyolefins of average polymerisation with a molecular weight of 300–5000 (known as "petroresins"), (g) polyamide and polyester resins, as for example linear or branched polyester resins based on phthalic acid, adipic acid or sebacic acid; (h) coumarone, indene, coumarone-indene and ketone resins; (i) cellulose derivatives, e.g. cellulose ethers, as for example ethyl cellulose and bezyl cellulose in ordinary commerical form, and also cellulose esters, as for example cellulose acetate, cellulose acetobutyrate and nitrocellulose, which can also be undernitrated.

As further granulating assistants there may also be mentioned the alkyl, cycloalkyl or aralkyl esters of dicarboxylic acids, for example phthalic acid, adipic and sebacic acid, as for example dibutyl, dioctyl, di-(2-ethylhexyl), dicyclohexyl or dibenzyl esters of phthalic, adipic or sebacic acid, as well as esters of phosphoric or phosphorous acid, for example tricresyl phosphates or trionylphenylphosphite, arylsulphonic acid esters of phenol or cresol, arylcarboxylic acid esters, for example trimethylol ethane tribenzoate, and alkaline earth metal salts of fatty acids of 12 to 24 carbon atoms, for example magnesium behenate and stearate.

For practical purposes 0.1 to 50 parts, preferably 1 to 25 parts, of the granulating assistant are used to 100 parts of the pigment or pigment preparation to be granulated.

When using pigment preparations, the carriers on which the preparations are based can, as the case may be, simultaneously assume the function of granulating assistant, so that in these cases it is superfluous to add a granulating assistant.

Water is used in the first liquid of the two-phase system in carrying out the process. As second liquid there is used an organic solvent or a mixture of two or more organic solvents which, under the given conditions, are virtually insoluble in water, i.e. they have a solubility of not more than 0.1 g/100 ml.

Examples of such organic solvents are (solubilities in accordance with the literature for temperatures of 20°–25° C):

Aliphatic or cycloaliphatic

-continued

| hydrocarbons: | |
|---|---|
| n-pentane | 0.036 g/100 ml |
| n-hexane | 0.014 g/100 ml |
| n-heptane | 0.005 g/100 ml |
| petroleum ether | <0.1 g/100 ml |
| cyclohexane | 0.01 g/100 ml |
| methylcyclohexane | <0.1 g/100 ml |
| Aromatic hydrocarbon: | |
| benzene | 0.082 g/100 ml |
| toluene | 0.47 g/100 ml |
| xylene mixture | 0.014 g/100 ml |
| mesitylene | 0.002 g/100 ml |
| ethylbenzene | 0.002 g/100 ml |
| n-propylbenzene | 0.006 g/100 ml (15° C) |
| cumene | <0.1 g/100 ml |
| Halogenated aliphatic hydrocarbons: | |
| freon | <0.1 g/100 ml |
| tetrachloroethylene | 0.04 g/100 ml |
| carbon tetrachloride | 0.08 g/100 ml |
| 1,1,1-trichloroethane | 0.001 g/100 ml |
| Halogenated aromatic hydrocarbons: | |
| chlorobenzene | 0.049 g/100 ml |
| o-dichlorobenzene | 0.015 g/100 ml |
| Alcohols: | |
| n-heptanol | 0.09 (18° C) g/100 ml |
| n-octanol | 0.054 (18° C) g/100 ml |
| iso-octanol | 0.07 (18° C) g/100 ml |
| 2-ethylhexanol-1 | 0.07 (18° C) g/100 ml |
| 2,2,4-trimethyl-1-pentanol | 0.03 (18° C) g/100 ml |
| 2,6-dimethyl-4-heptanol | 0.06 (18° C) g/100 ml |
| Ketones: | |
| diisobutyl ketone | 0.05 g/100 ml |
| Ethers: | |
| di-n-butyl ether | 0.03 g/100 ml |
| Esters: | |
| phenyl acetate | 0.03 g/100 ml |
| 2-ethylhexyl acetate | <0.03 g/100 ml |
| Aromatic nitro compounds: | |
| nitrotoluene-2 | 0.065 g/100 ml |

Preferred solvents are toluene, xylene mixture, chlorobenzene, and 1,1,1-trichloroethane.

A practical guideline for choosing the solvent is that the boiling point of the solvent will permit it to be removed by evaporation without detriment to the pigment. If appropriate, a solvent with a high boiling point which is used for granulating can be washed out, after the granules have been isolated from the aqueous phase, by another solvent which need not necessarily be water-insoluble but may not dissolve out the granulating assistant and is more easily removed by evaporation.

The pigments to be granulated can be dispersed or suspended either in the water or in the organic liquid. In the former case, the pigment is converted during the granulation into the organic phase by a flushing procedure.

For carrying out the process there are used appropriately 10 to 700 parts by volume of water to 10 parts of pigment. The lower limit of the amount of water is determined by the stirrability, but in principle there is no upper limit. However, in certain instances the presence of inorganic salts in the water can be advantageous. This makes it possible, for example, to lower the solubility of certain organic solvents in water, which in turn also makes it possible to use those solvents that have a solubility higher than 0.1 g/100 ml in pure water but lower than 0.1 g/100 ml in the salt-containing aqueous solution. It can also be useful to add small amounts of organic hydrotropic compounds, for example to hasten the formation of the granulates, especially if a start is made from dry pigment powders.

The amount of organic solvent used as second liquid phase depends on the amount of pigment used. It is preferably so chosen that the resultant granulate contains practically the entire amount of organic solvent used. Too small an amount of solvent prevents a uniform and complete granulate formation. If too large an amount of solvent is used, there is the danger of lumps being formed and of the processing being complicated.

Normally a ratio of 2 to 22 parts by volume of solvent to 10 parts by weight of pigment proves useful.

The granulation procedure takes place without wetting agents. By "wetting agents" are meant, for example, alkali soaps, aminocarboxylic acid soaps, sulphates, sulphonates, fatty acid esters of hydroxyalkanesulphonic acids, phosphate surfactants, fatty amine salts, fatty acid derivatives of polyhydric amines or aminoalcohols, quaternised amines, fatty acid esters of polyhydric alcohols, fatty acid alkylol amides, alkylene oxide adducts, lignin sulphonates, fatty acid alkylol aminoesters, amidazolyl fatty acid derivatives, quaternary pyrimidino or imidazole derivatives, betaine derivatives, ethoxylated mercaptans, amides, amines or polypropylene glycols.

The process according to the invention can be expediently carried out continuously or batchwise in such a manner that the organic liquid is added dropwise to the aqueous suspension of the pigment so as to form a multiphase system which is simultaneously subjected to vigorous turbulence. As a rule, the process is carried out at temperatures between 10° and 35° C.

The granulating assistants can be added to the water, the organic solvent, the pigment or, during the granulating process, to the multiphase system; preferably, however, they are dissolved in the organic phase.

The turbulent mixing is most easily effected by using a stirring device. After a short time, spherical agglomerates consisting of pigment, organic liquid and granulating assistant then usually form.

These agglomerates, which, on account of the water-insolubility of the organic liquid, contains practically the entire amount of this liquid, are isolated from the aqueous phase in a manner which is known per se, for example by filtering them off. The solvent-containing a glomerates are characterised by their very easy filterability.

Since the pigments are immersed in the organic solvent, the drying procedure is easily effected. To prevent any hardening of the pigment granules and to expedite the removal of the organic liquid, the drying is preferably carried out at temperatures below 80° C and desirably in vacuo.

The solvent vapours that occur during the drying can be separated and isolated. They do not pollute the exhaust air and no special ecological problems arise. It can on occasion be advantageous initially to wash out the waterinsoluble solvent contained in the isolated granulates with another organic solvent that is more easily removed. In special instances, the organic liquid can be frozen and removed by sublimation drying.

The granulates obtained according to the present invention can be used of the conventional pigment applications and have the same good dispersibility and the same coloristic properties as the starting pigments in powder form. They are substantially dustless and have a relatively good mechanical strength, i.e. they do not form any dust after prolonged storage and during transportation in containers.

The following Examples illustrate the invention, the parts and percentages being by weight unless otherwise stated.

EXAMPLE 1

40 g of moist filter cake containing 25 percent by weight of the red monoazo pigment of the formula

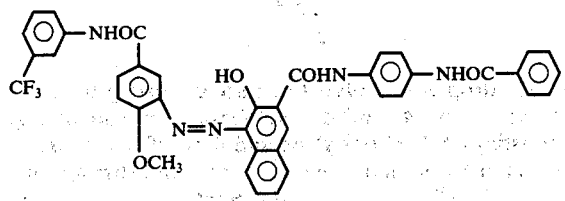

0.4 g of magnesium behenate and 100 ml of water are put into a glass bead mill with stirrer and having a capacity of app. 150 ml.

After stirring for 30 minutes while cooling with water to 20° C, the magnesium behenate is homogeneously mixed with the deagglomerated pigment which is thoroughly wetted with water. The pigment/magnesium behenate suspension is then flushed out of the mill with app. 250 ml of water, separated from the glass beads and put into an agitator vessel. With moderate stirring, 7 ml of xylene are added dropwise at room temperature to the suspension in the course of 20 minutes. The rate of stirring is so controlled that a spherical granulate consisting of pigment, magnesium behenate and solvent is obtained after stirring has been continued for 20 minutes at room temperature. The granulate is filtered off by suction filtration without any mechanical action on the filter product. The filtration proceeds very rapidly on account of the solvent still present in the granulate. The granulate is then dried in a vacuum drying cabinet at 60° C. A spherical pigment granulate is obtained with a particle diameter of app. 2–3 mm and a magnesium behenate content of app. 4%. When incorporated into e.g. soft PVC rolled sheet, it has good dispersant and coloristic properties.

EXAMPLE 2

10 g of the yellow pigment of the formula

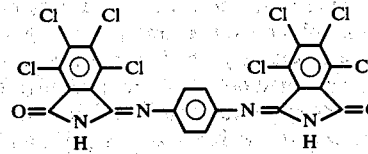

are deagglomerated and thoroughly wetted by being stirred in 130 ml of water for 10 minutes at room temperature in a glass bead mill with stirrer and having a capacity of app. 150 ml. The pigment suspension is subsequently flushed out of the mill with app. 250 ml of water, separated from the glass beads and put into an agitator vessel. A solution of 0.5 g of dioctyl phthalate in 4 ml of toluene and 3 ml petroleum ether is added in the course of 20 minutes at room temperature and added to the pigment suspension with moderate stirring. The rate of stirring is so controlled that a spherical granulate consisting of pigment, additive and solvents is obtained after stirring has been continued for a further 20 minutes at room temperature. The granulate is collected by suction filtration without mechanical action on the filter product. The filtration proceeds very easily on account of the solvents still present in the granulate. The granulate is then dried at 60° C in a vacuum drying cabinet. A spherical pigment granulate is obtained with a particle diameter of app. 2–3 mm. When incorporated into e.g. PVC soft plastic rolled sheet, it has the same dispersibility and the same coloristic properties as the pulverulent, dust starting pigment.

EXAMPLE 3

A spherical pigment granulate of equally good quality is obtained by using the yellow pigment of Example 2, but adding instead of the liquid dioctyl phthalate the same amount of solid dicyclohexyl phthalate and otherwise proceeding according to the particulars of Example 2.

EXAMPLE 4

A spherical pigment granulate of equally good quality is obtained by using the same pigment as in Example 2, but using 1.1 g of the glycerol ester of polymerised colophonium (Poly Pale Ester 10) as additive instead of 0.5 g of dioctyl phthalate and otherwise carrying out the same procedure as in Example 2.

EXAMPLE 5

A pigment granulate of equally good quality is obtained by proceeding as described in Example 2 but using 1.1 g of the pentearythritol ester of dimerised colophonium (Pentalyn K) as additive instead of 0.5 g of dioctyl phthalate.

EXAMPLE 6

A spherical pigment granulate of equally good quality is obtained by proceeding as described in Example 2 but using 1.1 g of an aromatic petroleum resin (Hercules Resin HC 110) instead of dioctyl phthalate.

EXAMPLE 7

A spherical pigment granulate of equally good quality is obtained by proceeding as described in Example 2 but using 1.1 g of trimethylol ethane tribenzoate (Benzoflex S432) instead of 0.5 g of dioctyl phthalate.

EXAMPLE 8

10 g of Flavanthrone Yellow containing 8.5% of colophonium resin are deagglomerated and thoroughly wetted by being stirred for 10 minutes at room temperature in 130 ml of water in a glass bead mill with a stirrer and a capacity of app. 150 ml. The pigment suspension is subsequently flushed out of the mill with app. 250 ml of water, separated from the glass beads and put into an agitator vessel. Then a solution of 0.5 g of magnesium behenate in 7 ml of xylene is added at room temperature in the course of 20 minutes to the pigment suspension with moderate stirring. The rate of stirring is so controlled that a granulate consisting of pigment, resin, magnesium behenate and solvent is obtained after stirring has been continued for 20 minutes at room temperature. The granulate is isolated by suction filtration without any mechanical action on the filter product. The filtration proceeds very easily on account of the solvent still present in the granulate. The granulate is subsequently dried in a vacuum cabinet at 60° C and the solvent removed. A spherical pigment granulate with a particle size of app. 2–3 mm is obtained which has the same dispersibility and the same coloristic properties as the dusty yellow pigment in powder form when incorporated into soft PVC rolled sheet.

EXAMPLE 9

A pigment granulate of equally good quality is obtained by proceeding as in Example 8 but using the resin-free yellow pigment of the formula

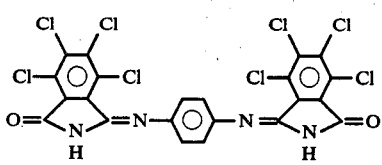

instead of Flavanthrone Yellow.

EXAMPLE 10

A pigment granulate of equally good quality is obtained by proceeding as in Example 8, but without the addition of magensium behenate and replacing xylene by a solvent mixture consisting of 4 ml of xylene and 4 ml of cyclohexane in which the resin contained in the pigment is slightly soluble.

EXAMPLE 11

10 g of Flavanthrone Yellow, 0.5 g of magnesium behenate and 130 ml of water are put into a glass bead mill equipped with stirrer. After the mixture has been stirred for 30 minutes, with water cooling, to app. 20° C, the magnesium behenate is homogeneously mixed with the deagglomerated and thoroughly wetted pigment. The suspension is then flushed out of the mill with about 250 ml of water, separated from the glass beads and put into an agitator vessel. With stirring, a solvent mixture consisting of 4 ml of xylene and 4 ml of cyclohexane is added dropwise in the course of 20 minutes and a granulate consisting of yellow pigment, magnesium behenate, solvent mixture and resin is obtained. Immediately after the dropwise addition of the solvent mixture, the granulate is isolated from the water by suction filtration without mechanical action on the filter product. The filtration proceeds very easily on account of the solvents present in the granulate. The granulate is dried by a vaccum cabinet at 50° C and the solvents removed. A spherical granulate with a particle size of app. 2–4 mm is obtained. When incorporated e.g. into soft PVC rolled sheet, it has dispersant and coloristic properties analogous to those of the dusty pigment in powder form.

EXAMPLE 12

A pigment granulate of equally good quality is obtained by proceeding as in Example 11, but using instead of the flavanthrone pigment a red pigment of the formula

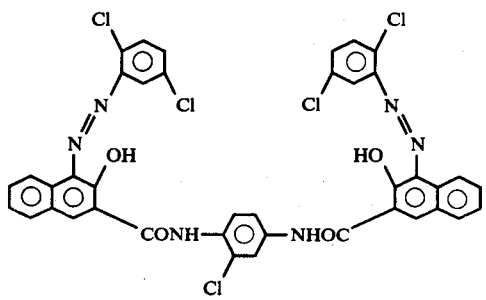

adding dropwise a solvent mixture consisting of 3.5 ml of xylene and 4.5 ml of cyclohexane instead of that consisting of 4 ml of xylene and 4 ml of cyclohexane, and, after addition of the solvent mixture, stirring for a further 20 minutes at room temperature.

EXAMPLE 13

The yellow pigment of the formula

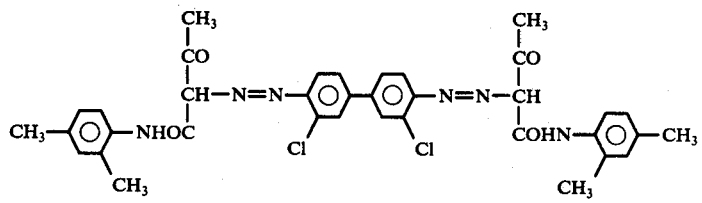

obtained by coupling tetraazotised 3,3'-dichloro-4,4'-diaminodiphenyl-1-aceto- with acetylamino-2,4-dimethylbenzene, is granulated by adding dropwise, with stirring, at room temperature in the course of app. 15 minutes a solution of 0.2 g of the petroleum resin Hercules Resin HC 110 in 15 ml of 1,1,1-trichloroethane to 300 ml of a suspension, obtained direct from the synthesis, containing app. 8 g of pigment. The rate of stirring is so controlled that a spherical granulate consisting of pigment, resin and solvent is obtained after stirring has been continued for 5 minutes at room temperature. The granulate is isolated, without mechanical action, by suction filtration from the aqueous phase which still contains water-soluble impurities resulting from the synthesis and washed with 400 ml of water. The filtration and washing procedure is effected very rapidly on account of the solvent still present in the granulate. The granulate is subsequently freed from solvent and dried in a vacuum cabinet at 60° C. A spherical pigment granulate with a particle size of app. 1–3 mm is obtained. When incorporated e.g. into various paint and varnish systems it exhibits good dispersant and coloristic properties.

EXAMPLE 14

Using a toothed disc stirrer, 27 g of a moist press cake containing 3% of colophonium resin and 37% of the violet dioxazine pigment of the formula

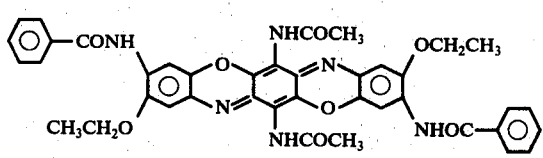

are deagglomerated and homogeneously mixed in 130 ml of water in a 500 ml glass beaker in the course of 20 minutes at room temperature. The pigment/colophonium resin suspension is then put into an agitator vessel. With moderate stirring, 7.5 ml of xylene are then added dropwise to the suspension at room temperature in the course of app. 15 minutes. The rate of stirring is so controlled that a spherical granulate consisting of pigment, resin and solvent is obtained after stirring has been continued for 5 minutes at room temperature. The granulate is isolated by suction filtration without mechanical action on the filter product. The filtration proceeds very rapidly on account of the solvent still present in the granulate. The granulate is subsequently freed from solvent and dried in a vacuum cabinet at 60° C. A spherical pigment granulate is obtained with a particle size of app. 1–3 mm and a colophonium resin content of app. 8%. When incorporated e.g. into soft PVC rolled sheet, it exbibits good dispersant and coloristic properties.

EXAMPLE 15

Using a toothed disc stirrer, 30.1 g of a moist press cake containing 33.2% of the yellow disazo pigment of the formula

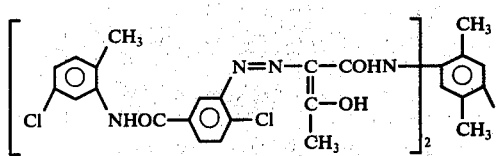

are deagglomerated in 200 ml of water in a 500 ml of glass beaker in the course of app. 20 minutes at room temperature. The pigment suspension is then put into an agitator vessel. With moderate stirring, a solution of 0.5 g of cellulose acetobutyrate in 12 ml of 1,1,1-trichloroethane is added dropwise to the suspension in the course of app. 20 minutes at room temperature. The rate of stirring is so controlled that a spherical granulate consisting of pigment, cellulose acetobutyrate and solvent is obtained after stirring has been continued for 5 minutes at room temperature. The granulate is isolated by suction filtration without any mechanical action on the filter product. The filtration proceeds very rapidly on account of the solvent still present in the granulate. The granulate is subsequently freed from solvent and dried in a vacuum cabinet and dried. A spherical pigment granulate with a particle diamter of app. 1–2 mm is obtained. When incorporated into e.g. soft PVC rolled sheets, it exhibits good dispersant and coloristic properities.

EXAMPLE 16

A spherical pigment granulate of equally good quality is obtained by using the yellow pigment of Example 15, but replacing the 0.5 g of cellulose acetobutyrate by a solution of 0.2 g of a polystyrene in 10 ml of xylene and otherwise carrying out the procedure as described in Example 15.

EXAMPLE 17

A spherical pigment granulate of equally good quality is obtained by using the same yellow pigment as in Example 15, but replacing cellulose acetobutyrate by the same amount of the benzenesulphonic amide Dellatol MMA (Bayer) as granulating assistant and otherwise proceeding in the same manner as in Example 15.

EXAMPLE 18

A pigment granulate of equally good quality is obtained by carrying out the procedure of Example 15, but replacing cellulose acetobutyrate by the same amount of tricresyl phosphate.

EXAMPLE 19

A pigment granulate of equally good quality is obtained by carrying out the procedure of Example 15, but replacing cellulose acetobutyrate by the same amount of a terpene resin (Terpalyn A3, Hercules).

EXAMPLE 20

A pigment granulate of equally good quality is obtained by carrying out the procedure of Example 15, but replacing cellulose acetobutyrate by the same amount of a maleic resin (Hobimal P 65, NV Zaanochemie, Holland).

EXAMPLE 21

10 g of the orange pigment of the formula

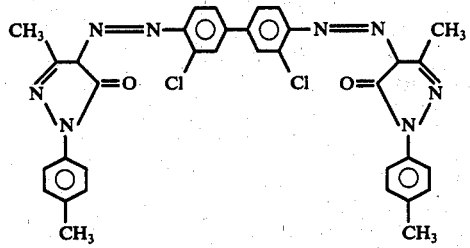

are deagglomerated and thoroughly wetted by being stirred for 10 minutes at room temperature in 130 ml of water in a glass bead mill with stirrer and a capacity of app. 150 ml. The pigment suspension is subsequently flushed out of the mill with app. 250 ml of water, separated from the glass beads and put into an agitator vessel. Then a solution of 1.1 g of dicyclohexy phthalate in 5 ml of 1,1,1-trichloroethane and 3 ml of xylene is added, with moderate stirring, to the pigment suspension at room temperature in the course of 20 minutes.

The rate of stirring is so controlled that a spherical granulate consisting of pigment, dicyclohexy phthalate and solvents is obtained after stirring has been continued for 20 minutes at room temperature. The granulate is isolated from the water by suction filtration without mechanical action on the filter product. The filtration proceeds very rapidly on account of the solvents still present in the granulate. The granulate is subsequently freed from solvent and dried in a vacuum cabinet at 60° C. A spherical pigment granulate with a particle diameter of app. 1–3 mm is obtained. When incorporated e.g. into different varnish and paint systems, it has the same dispersant and coloristic properties as the dusty starting pigment in powder form.

EXAMPLE 22

A granulate of equally good quality is obtained by proceeding in analogous manner to Example 21, but using a β-Cuphthalocyanin pigment instead of the orange pigment, 1.1 g of dioctyl phthalate instead of 1.1 g of dicyclohexyl phthalate, and only 6 ml of toluene as solvent.

EXAMPLE 23

A granulate of equally good quality is obtained by proceeding as in Example 22, but using instead of dioctyl phthalate the same amount of a viscous polyisobutylene (Oppanol B3, BASF) and instead of 6 ml of toluene a solvent mixture of 4 ml of cyclohexane and 3 ml of toluene.

EXAMPLE 24

A granulate of equally good quality is obtained by proceeding as in Example 23, but using instead of polyisobutylene 1.1 g of the colophonium resin of Example 4.

EXAMPLE 25

A granulate of equally good quality is obtained by proceeding as in Example 23, but using instead of polyisobutylene the same amount of an epoxidised soya bean oil (Rheoplast 39).

EXAMPLE 26

10 g of the red disazo pigment used in Example 12 and 130 ml of water are put into a glass bead mill with stirrer and with a capacity of app. 150 ml. After it has been stirred for 10 minutes at room temperature, the pigment is deagglomerated and thoroughly wetted by the water. The suspension is then flushed out of the mill with app. 250 ml of water, separated from the glass beads and put into an agitator vessel. With moderate stirring, a solution of 0.5 g of a polyisobutylene (Oppanol B3) in a solvent mixture of 3.5 ml of xylene and 4.5 ml of cyclohexane is then added in the course of 20 minutes at room temperature. The rate of stirring is so controlled that spherical granulate consisting of pigment, polyisobutylene and solvents is obtained after stirring has been continued for 20 minutes at room temperature. The granulate is separated from the water by suction filtration without mechanical action on the filter product. The filtration proceeds very easily on account of the solvent still present in the granulate. The granulate is subsequently freed from solvent and dried in a vacuum cabinet at 60° C. A spherical pigment granulate with a particle diameter of app. 2-4 mm is obtained. When incorporated into e.g. soft PVC rolled sheets it has the same dispersant and coloristic properties as the very dusty starting pigment in powder form.

EXAMPLE 27

10 g of a pigment preparation in powder form consisting 50% of β-Cu-phthalocyanin and 50% of ethyl cellulose are deagglomerated and thoroughly wetted by being stirred for 10 minutes at room temperature in 130 ml of water in a glass bead mill with stirred of app. 150 ml capacity. The resultant blue suspension is subsequently flushed out of the mill with app. 250 ml of water, separated from the glass beads and put into an agitator flask. A solvent mixture consisting of 4 ml of chlorobenzene and 2 ml of methyl ethyl ketone in which the ethyl cellulose is slightly soluble is then added in the course of 20 minutes at room temperature to the pigment suspension, with moderate stirring. The rate at which the batch is stirred is such that a spherical granulate consisting of pigment preparation and solvents is obtained after stirring has been continued for 20 minutes. The granulate is isolated from the water by suction filtration with mechanical action on the filter product. The granulate is subsequently freed from the solvents and dried at 60° C in a vacuum cabinet. A spherical granulate with a particle diameter of app. 2 mm is obtained. Its behaviour in application is as good as that of the dusty starting product in powder form.

EXAMPLE 28

A pigment preparation granulate of equally good quality is obtained by proceeding as in Example 27, but using instead of the ethyl cellulose preparation the same amount of 50% β-Cu-phthalocyanin preparation which contains a vinyl chloride/vinyl acetate copolymer as carrier resin and 7 ml of trichloroethane and 1 ml of petroleum ether as solvent mixture (b.p. 50°-60° C).

EXAMPLE 29

A pigment preparation granulate with a particle diameter of app. 1-4 mm which yields colourations of as good quality as the very dusty pigment preparation powder is obtained by proceeding as in Example 27, but using instead of the ethyl cellulose preparation a 50% β-Cu-phthalocyanin preparation which contains magnesium behanate as carrier and only 5 ml of toluene as solvent.

We claim:

1. A process for the manufacture of an easily isolatable, dustless, readily dispersible pigment granulate, which comprises gradually adding, at a temperature between 10°-35° C under turbulent mixture, to a suspension of 10 parts of a finely dispersed organic pigment or pigment preparation in 10-700 parts of water 2-22 parts of an organic solvent being virtually insoluble in water, and having dissolved 0.1-2.5 parts of water-insoluble granulating assistants belonging to the class of natural, synthetic or semi-synthetic resins, esters of dicarboxylic acids, of arylcarboxylic acids, of arylsulphonic acids, of phosphoric and phosphorous acid, phenylsulphonamides or the alkaline salts of fatty acids containing 12 to 14 carbon atoms but, in the absence of wetting agents whereby a granulate is formed, then isolating said granulate, which consists substantially of pigment or pigment preparation, granulating assistant and organic solvent, and removing the solvent therefrom.

2. A process according to claim 1, wherein a start is made from an aqueous suspension of the pigment or pigment preparation.

3. A process according to claim 1, wherein a cellulose derivative is used as granulating assistant.

4. A process according to claim 1, wherein an alkaline earth salt of a fatty acid of 12 to 24 carbon atoms is used as granulating assistant.

5. A process according to claim 1, wherein a natural, synthetic or semi-synthetic resin is used as granulating assistant.

6. A process according to claim 1, wherein 1,1,1-trichloroethane is used as organic solvent.

7. A process according to claim 1, wherein toluene or xylene is used as organic solvent.

8. A process according to claim 1, wherein chlorobenzene is used as organic solvent.

9. A process according to claim 1, wherein 0.1 to 50 parts of the granulating assistant are used to 100 parts of pigment.

10. A process according to claim 1, wherein the ratio of pigment to organic solvent is such that the resultant granulate contains practically the entire amount of organic solvent used.

11. A process according to claim 1, wherein 2 to 22 parts by volume of organic solvent are used to 10 parts of pigment.

12. A process according to claim 1, wherein the turbulent mixing is carried out with a stirring device.

13. A process according to claim 1, wherein the solvent is removed by evaporation.

14. A process according to claim 1, wherein the process is carried out without the application of external heat.

15. The granulates obtained according to claim 1.

* * * * *